United States Patent [19]
Bryant et al.

[11] Patent Number: 6,071,639
[45] Date of Patent: Jun. 6, 2000

[54] BATTERY CARTRIDGE

[75] Inventors: Mark Alan Bryant; Roger Douglas Whiddon; Harrison Lewis Buchanan, Jr.; Lapthe Chau Flora, all of Roanoke; John Carl Nelson, Salem, all of Va.

[73] Assignee: ITT Manufacturing Enterprises, Wilmington, Del.

[21] Appl. No.: 09/074,238

[22] Filed: May 7, 1998

[51] Int. Cl.$^7$ ........................................ H01M 2/10
[52] U.S. Cl. ........................... 429/97; 429/99; 429/100
[58] Field of Search .................. 429/96, 97, 99, 429/100, 163

[56] References Cited

U.S. PATENT DOCUMENTS 5,567,545  10/1996  Murakami .................... 429/163
5,631,098  5/1997  Suzuki ............................ 429/1
5,945,235  8/1999  Clanton et al. .................. 429/98

*Primary Examiner*—Maria Nuzzolillo
*Assistant Examiner*—Tracy Dove
*Attorney, Agent, or Firm*—Arthur L. Plevy; Buchanan Ingersoll PC

[57] ABSTRACT

A battery cartridge holding a plurality of batteries for insertion into a battery cavity comprising a housing including first and second flexible holding members oppositely disposed with respect to one another on a first outer surface, the first and second holding members defining a cavity contoured to the shape of the batteries for receiving the batteries and securing thereto, a second inner surface having a recess formed therein, and a latching means coupled between the inner surface of the housing and a front cover portion and retractably extendable for engaging/disengaging slots positioned on a peripheral lip portion of the battery cavity for permitting insertion/ejection of the battery cartridge into/from the battery cavity.

27 Claims, 18 Drawing Sheets

6,071,639

BATTERY CARTRIDGE

FIELD OF THE INVENTION

The invention is related to battery containers in general, and more particularly to a battery cartridge for holding batteries for insertion into a cavity of an electronic device.

BACKGROUND OF THE INVENTION

Many electrical devices incorporate a battery cap to capture batteries inserted into the battery cavity of the device. The battery cap thus serves to hold batteries securely within a device. Another important function of the battery cap is to provide electrical contact through a contact spring or bar to the actual batteries.

In prior art battery devices, problems arise when replacing non-operating batteries from a system. The battery cap must be screwed or turned off, and new batteries must be properly oriented into the system before replacing the battery cap. This process is time consuming and often difficult when performed in a dark or environmentally harsh situation. Accordingly, a device for easily and quickly replacing non-operating batteries is highly desired.

SUMMARY

It is an object of the present invention to provide a battery cartridge holding an at least one battery for insertion into a battery cavity, comprising: a housing including flexible holding means contoured to the shape of said at least one battery for receiving said battery and securing thereto, said flexible holding means disposed on a first outer surface of said housing, and a second inner surface having a recess formed therein; and latching means retractably extending for engaging slots positioned on a peripheral lip portion of said battery cavity during insertion of said battery cartridge. The battery cartridge further comprises depressible lever means responsive to an external force for causing said latching means to retract for disengaging from said slots; and a front cover coupled to said inner surface of said housing for securing said latching means and said depressible lever means.

DETAILED DESCRIPTION OF THE INVENTION

Before embarking on a detailed discussion, the following should be understood. The battery cartridge according to the present invention allows for batteries to be loaded into the battery cartridge before the battery cartridge is inserted into the battery cavity of a device. This is beneficial since a user can easily and quickly replace the non-operating batteries with a pre-loaded battery cartridge. This eliminates the time required to search for and orient the replacement batteries.

The battery cartridge also provides a unique latching mechanism which allows for fast and accurate fastening to the electrical device. Compressible latches on the battery cartridge move inward when compressed and then snap-out to engage slots located on the sides of a battery cavity of a device which receives the cartridge. However, the user does not have to compress the latches to insert the battery cartridge. This design allows the user to simply press directly down in the center of the battery cartridge cover during insertion of the battery cavity. As the battery cartridge engages the internal walls of the battery cavity, the latches automatically compress due to the interference fit between the latches and the battery cavity internal wall.

Figure 1A:
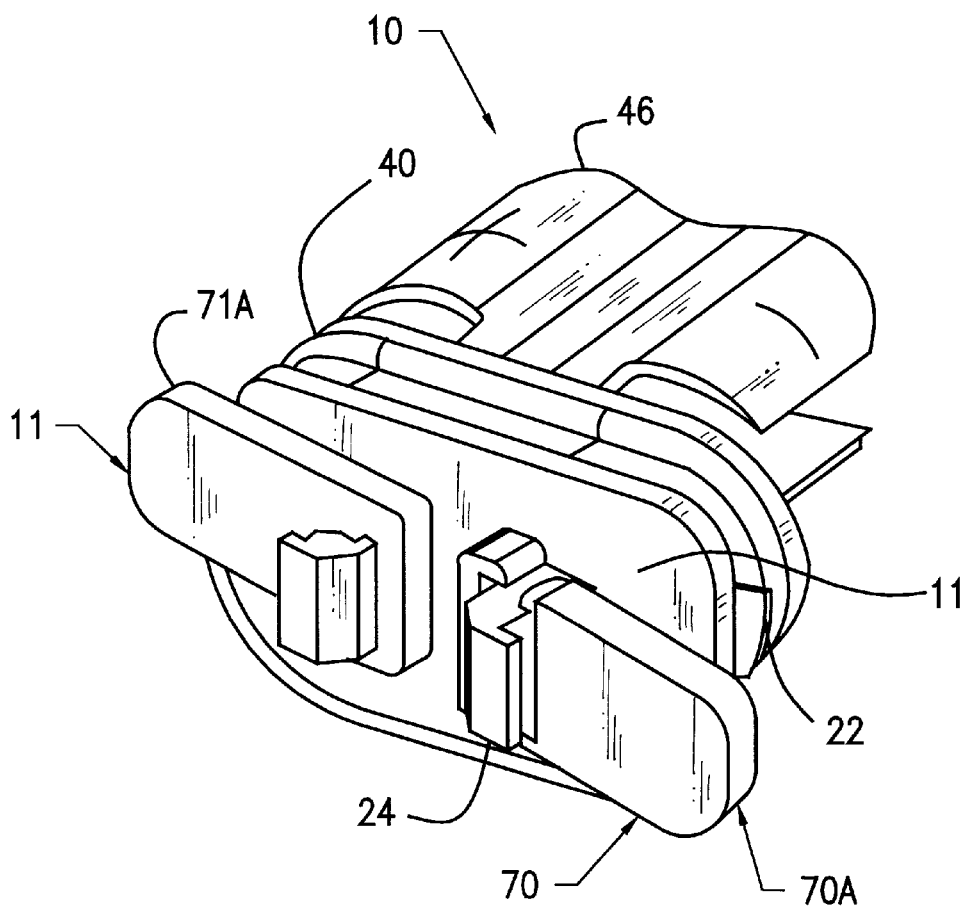
FIGS. 1A and 1B show assembled and exploded perspective views, respectively, of the battery cartridge according to the present invention.
Figure 1B:
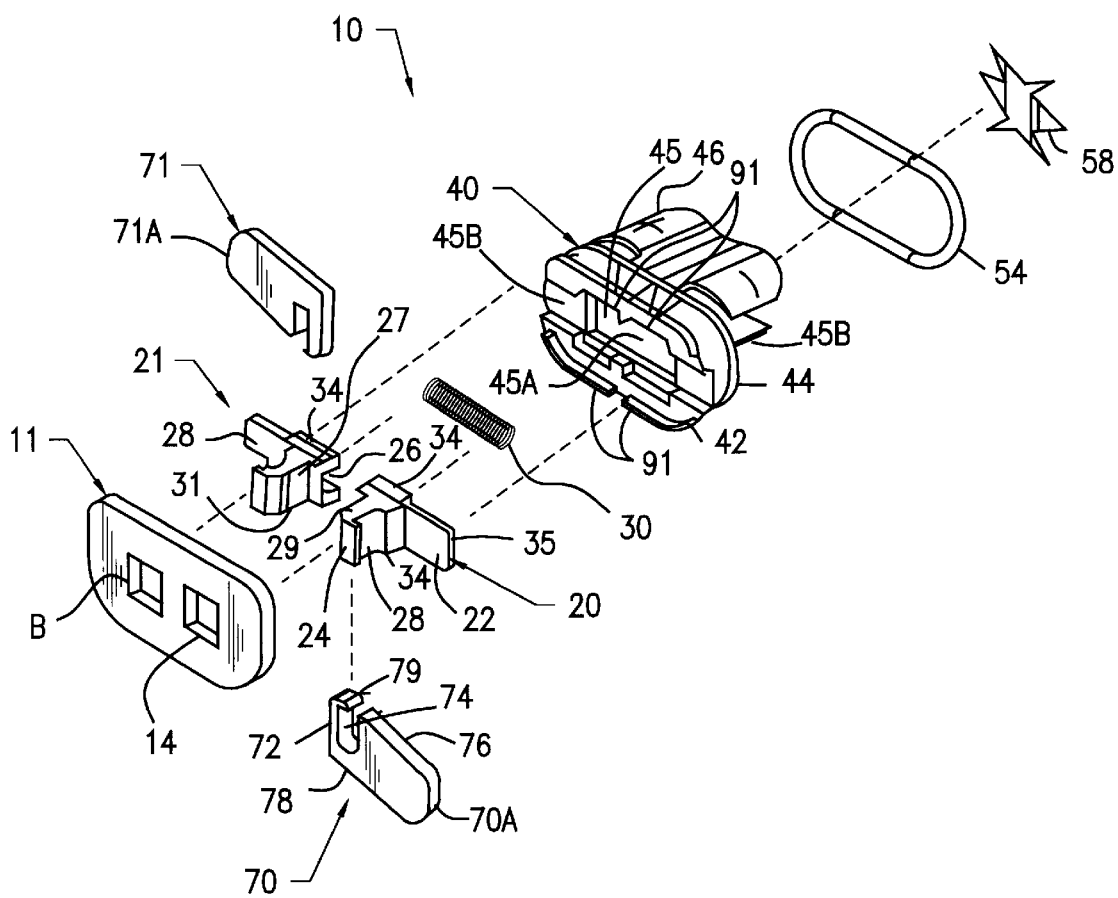
Figure 6:
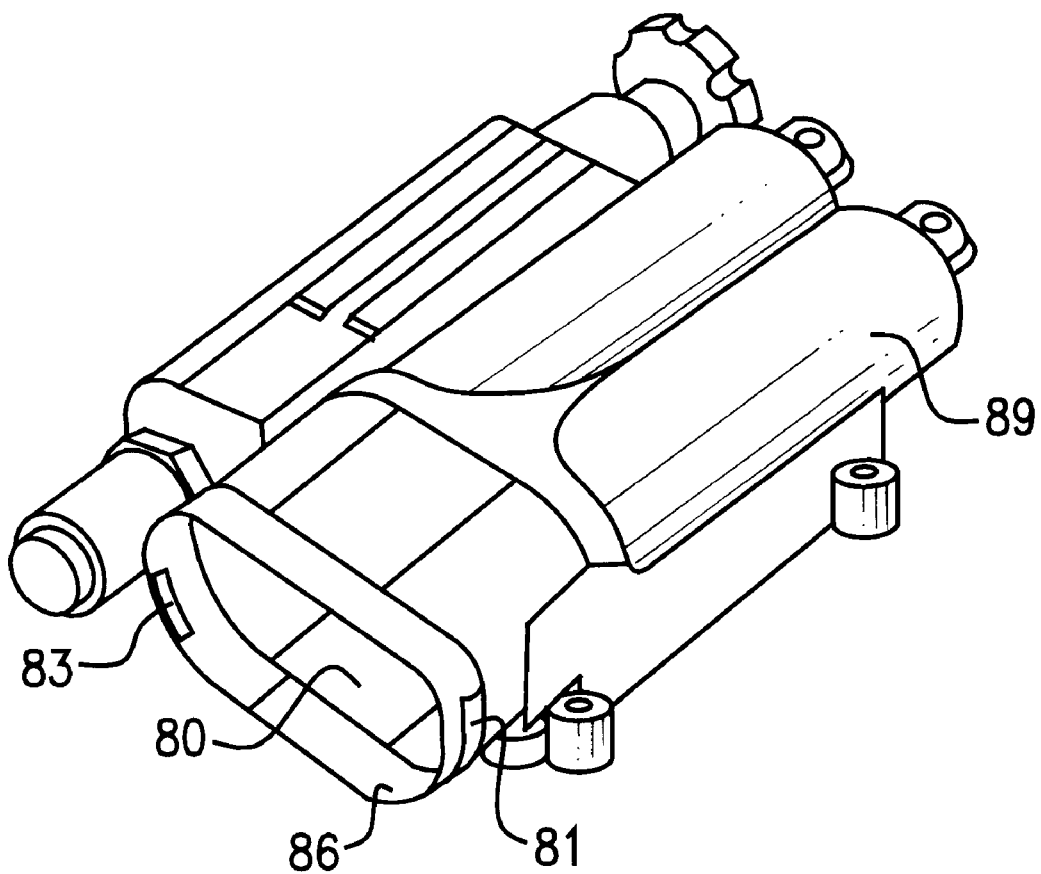
FIG. 6 shows a battery cavity for receiving the battery cartridge according to the present invention.

Referring to FIGS. 1A and 1B there is shown assembled views and exploded views respectively of the battery cartridge 10 according to an embodiment of the present invention. Note that when referring to the drawings, like reference numerals are used to indicate like parts. The battery cartridge 10 is preferably employed in a monocular night vision device such as that described in co-pending, commonly assigned patent application Ser. No. 09/098,098, filed Jun. 16, 1998, entitled "IMPROVED MONOCULAR NIGHT VISION DEVICE" assigned to ITT Corporation and incorporated herein by reference. FIG. 1A shows a battery cartridge 10 having a front cover 11 bonded to housing 40. Latch extensions 22 extend outward in a lateral direction beyond the periphery of front cover 11. The latch extensions 22 are disposed between housing 40 and cover 11 and are operable for engaging corresponding slots positioned on the peripheral surface of the battery cavity 80 as shown in FIG. 6. The battery cartridge of FIG. 1A further includes first and second levers 70 and 71 outwardly extending from the outer surface of the front cover 11 and integrally coupled to an arcuate receiver portion 24 which extends through slots (FIG. 1B) in the front cover. The arcuate receiver portion 24 is monolithically coupled to extension portion 22 to comprise first and second latches 20 and 21 (see FIG. 1B). Latches 20 and 21 are retractably extendable in response to the inward urging of levers 70 and 71. That is, exerting inwardly directed forces on outside surfaces 70A and 71A of levers 70 and 71 which engage latches 20 and 21 respectively, cause the forces to be exerted inwardly onto the respective latches. This results in the latches urging toward one another and thus, extension portions 22 retract by an amount commensurate with the amount of force applied to the levers. When sufficient force is applied inwardly to the levers, the extension portions of the latches retract within the periphery of the front cover. A spring 30 (see FIG. 1B) is provided within a cavity of each of the latches to provide an opposing force such that when no force is applied to the levers 70, 71, the tip of extension portion 22 extends beyond the periphery of the front cover.

Referring now to FIG. 1B, an exploded view of the battery cartridge shown in FIG. 1A is provided. The battery cartridge 10 comprises a front cover 11 having rectangular slots 13 and 14 each receiving one of latching devices 20 and 21. A spring 30 is flexibly coupled between each of the latches 20, 21 to maintain a flexible separation between the latches. Each of the latches 20, 21 comprise a first extension portion 22 which is substantially planar, and laterally extending. A second arcuate portion 24 extends therefrom and is substantially perpendicular to extension portion 22. The second arcuate portion 24 is integrally coupled to first portion 22. Each latch further includes cavity 26 for receiving spring 30. The second arcuate portion of each latch is provided with curved slot 28 representing a first surface and planar surface 27 opposite the curved surface 28. Inwardly depressible lever members 70, 71 are then coupled to a corresponding latch 20, 21 by slidably inserting the lever 70 onto the arcuate shaped second portion 24 such that curved surface 28 of arcuate portion 24 securely fits within cavity 74. Lever 70 comprises a rectangular shaped body having a curved exterior portion 70A extending between a substantially planar top surface 76 and bottom surface 78. Cavity 74 extends from the top surface 76 downward towards bottom surface 78. Arm 72 extends vertically upward from bottom surface 78 to a position higher than top surface 74. Notch 79 integrally extends in a horizontal direction from the top of arm 72 and in substantially parallel arrangement to top surface 74. As shown in FIG. 1B, arcuate portion 24 of latch 20 is inserted into cavity 74 of lever 70 such that notch 79 extends over and rests upon top surface 29. Lever 71 and latch 21 are coupled in similar fashion except that top surface 29 is inserted into cavity 74 such that notch 79 extends over and engages bottom surface 31 of latch 21. The arrangement of front cover 11 with levers 70, 71 and latches 20, 21 operates to secure the levers and latches to front cover of the device. The cover 11, and latches 20, 21 are then inserted into housing 40. Housing 40 has an interior surface 42 contoured to receive the latches and secure thereto. Recess 45 formed on the interior surface 42 of housing 40 further comprises first cavity 45A formed for receiving spring 30 and cavity portion 26 of latches 20 and 21, and second cavity 45B accommodating and slidably engaging extension portion 22 of each of the latches. Ledge portions 34 located on the top and bottom surfaces of latches 20 and 21 and extending vertically therefrom, slidingly engage corresponding ledge portion 91 within recess 45 to permit horizonal movement of the latches. An outer surface 44 from which extends battery holders 46 receives and accommodates two AA batteries 50 (FIG. 2).

Figure 2A:
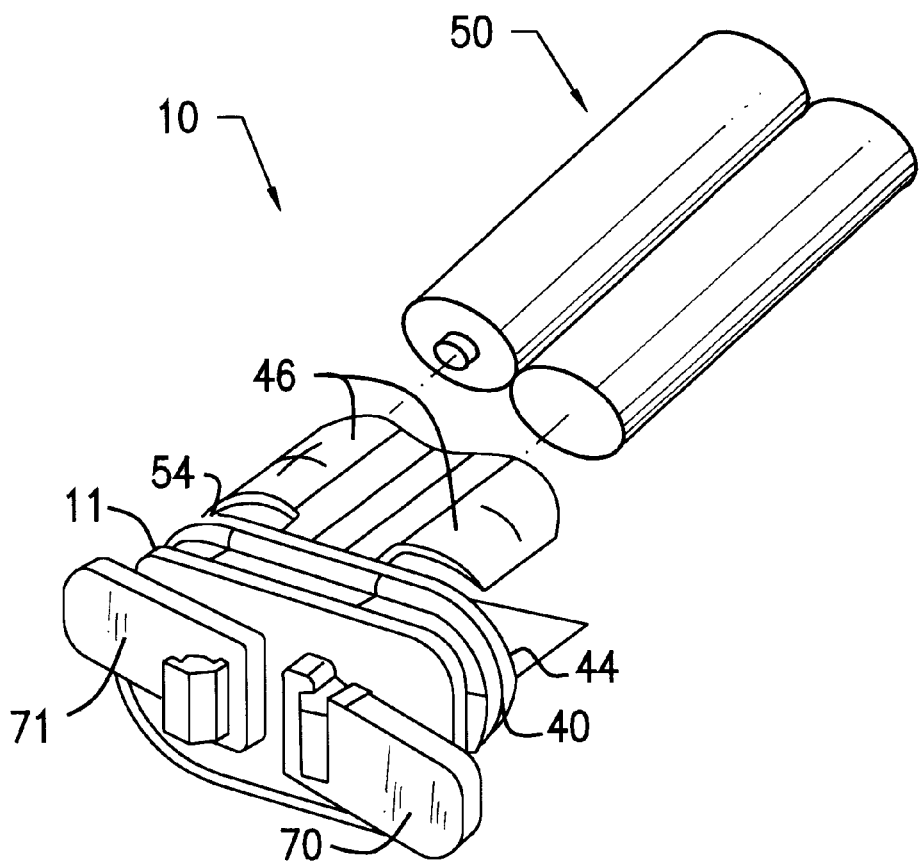
FIGS. 2A and 2B show a preferred embodiment of a battery cartridge where the battery holders are located on the bottom of the battery cartridge housing.
Figure 7:
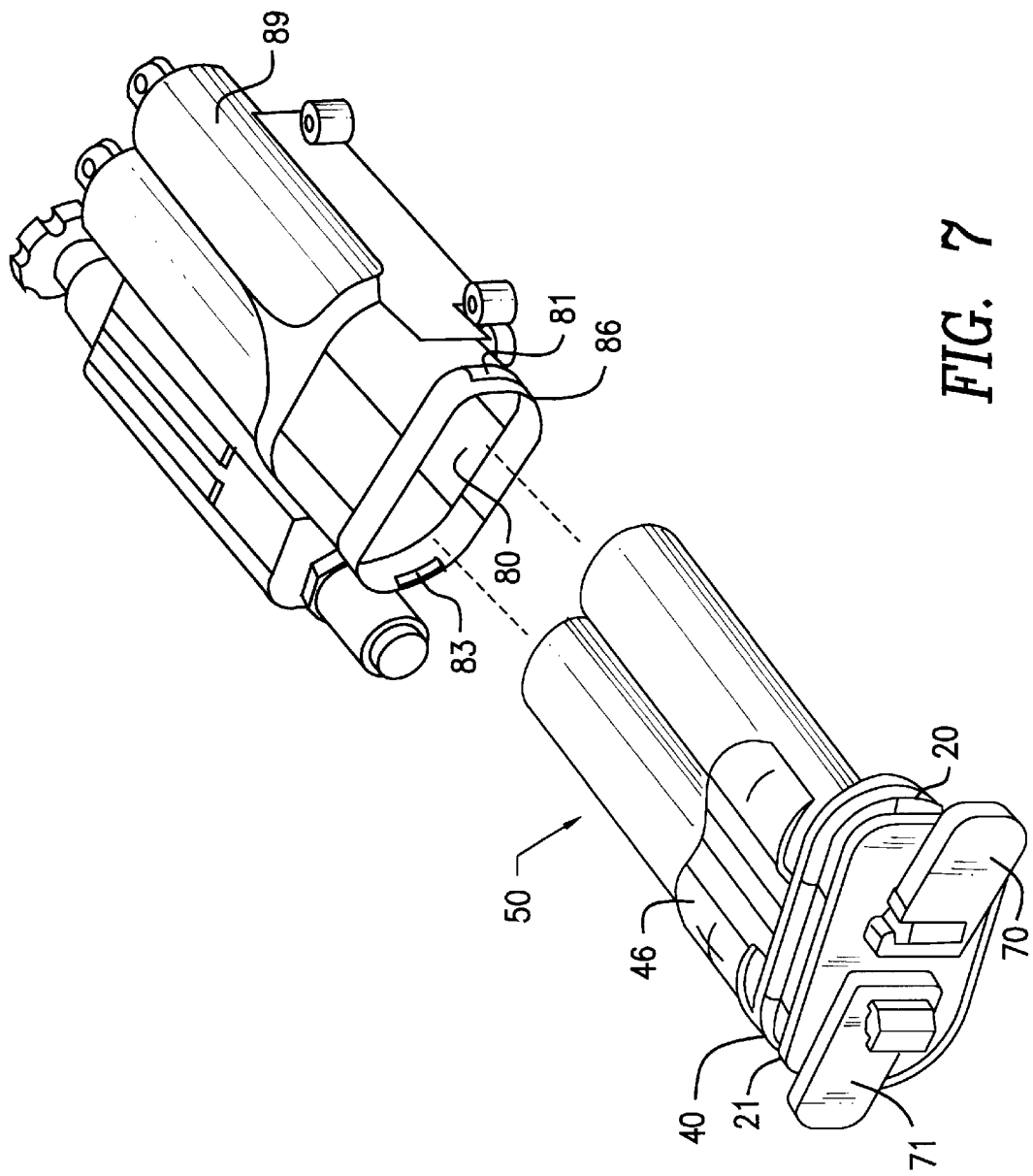
FIG. 7 provides an illustration of the method of insertion of the battery cartridge into the battery cavity housed within a monocular night vision device according to the present invention.

The battery cartridge works by inserting the batteries 50 into the battery holders 46 on the surface 44 of the battery cartridge housing and then inserting the battery cartridge into the battery cavity of the device as shown in FIG. 2A. FIGS. 6 and 7 show a view of a battery cavity 80 in a monocular night vision device into which the cartridge 10 is inserted. As the battery cartridge 10 is inserted into cavity 80, the latches 20, 21 engage the peripheral lip or flange portion 86 and depress due to the forces on the battery cavity wall. That is, as the first surface of each extending latch portion 22 contacts the sides of cavity 80, the latches retract due to the pressure exerted on them during insertion. Preferably, the end portion or tips 35 of each latch 20, 21 are angled at 45° to permit the latch to slide over and into the accommodating slots 81, 83 of battery cavity 80. A portion of the sides of lip 86 are also similarly angled to receive latches 20, 21. The latches will snap back out due to the force of spring 30 as they enter the locking slots 81,83 located on the sides within battery cavity 80. In the preferred embodiment, the cartridge housing, battery cavity, and front cover are made of a resilient and lightweight material, such as plastic.

Figure 8:
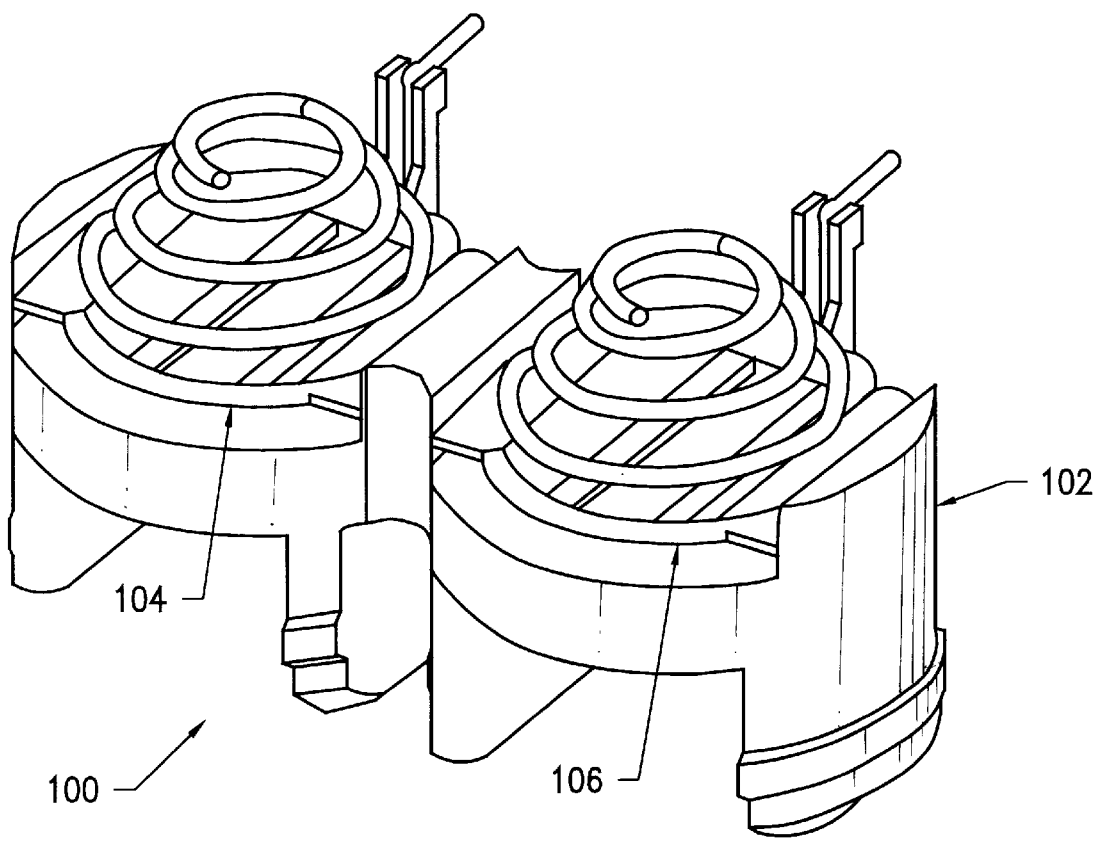
FIG. 8 is an illustration of the spring assembly positioned in the rear of the battery cavity for receiving the battery cartridge according to the present invention.

The battery cartridge can be removed from the battery cavity by depressing the levers 70, 71 that extend out the side of the battery cartridge. This depression in turn urges latches 20, 21 toward one another and thus disengage the latches from locking slots 81 and 83. The battery cavity also includes a rear battery receiving portion 89 for receiving each of the batteries 50. The rear battery receiving portion further includes a battery spring assembly 100 comprising a spring holder 102 and two conical springs 104, 106 positioned at the bottom of the battery cavity as shown in FIG. 8. The battery spring assembly 100 serves as the base for the battery cavity and provides the contact between the batteries. When the batteries are loaded into the battery cartridge, the springs 104, 106 in the bottom of the battery cavity 81 operate to force the batteries 50 and the battery cartridge 10 out of the battery cavity 80 when the levers 70, 71 are depressed. If the batteries are not loaded into the battery cartridge, then the springs 104, 106 in the bottom of the battery cavity 80 have no affect on battery cartridge 10. In that case, to remove the battery cartridge, levers 70, 71 are depressed and the battery cartridge must be pulled out of the battery cavity.

As one can ascertain, spring 30 is positioned between latches 20, 21 as illustrated in FIG. 1B and abut an inner wall of each latch so that the latches extend or "push" outwardly when not depressed by an external force. An o-ring 54 may be disposed around the exterior perimeter of surface 44 of the battery cartridge housing to provide an environmental seal when inserted into the battery cavity 80 of the device, as shown in FIG. 1B.

Figure 2B:
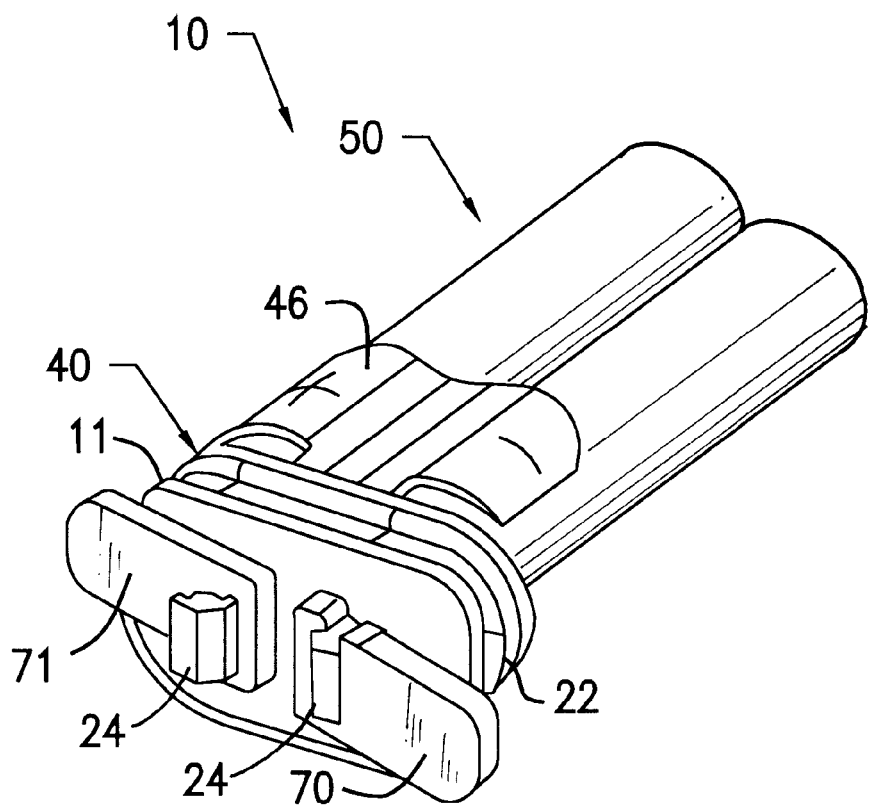
Figure 3A:
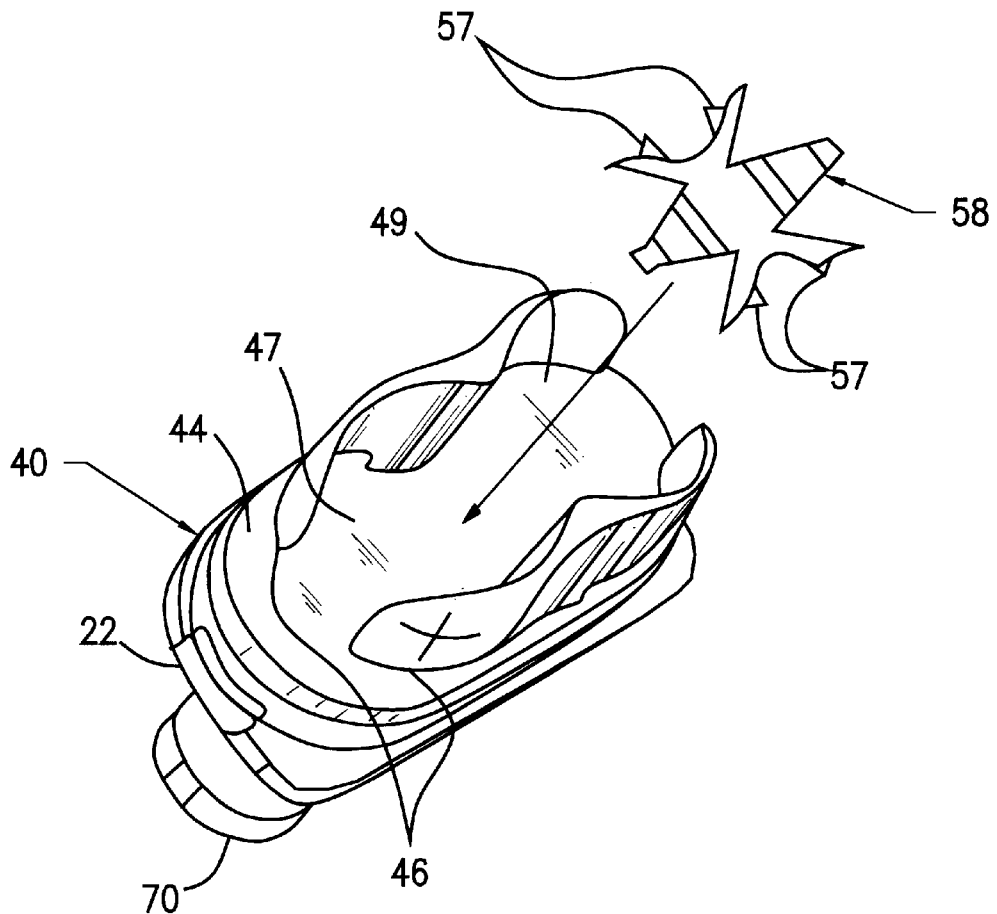
FIGS. 3A and 3B show the battery cartridge housing having a contact bar in which gripping elements hold the contact bar in place according to the present invention.
Figure 3B:
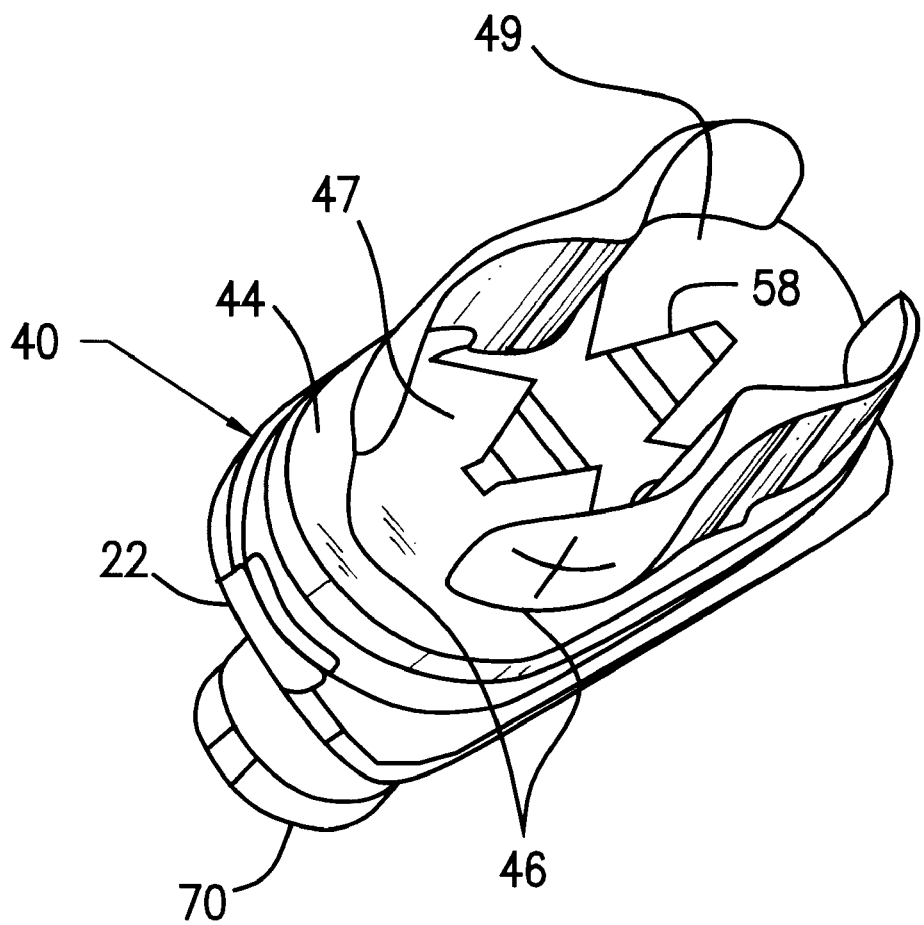

FIGS. 2A–B illustrate exploded and assembled perspective views, respectively of the coupling of batteries 50 into battery cartridge 10. Battery holders 46 extend upwardly from the bottom surface 44 of the battery cartridge housing 40. The design of battery holders 46 allows for one battery to be loaded into the battery cartridge at a time. As best shown in FIGS. 3A–B, the battery holders 46 are made of a resilient material such as plastic and contoured to the dimensions of battery 50 so as to flex outward when a battery is inserted into cavities 47, 49 and grip onto the battery, thereby holding it in place. Positive (+) and negative (−) battery polarity indicators are located on the sides of the battery cartridge holders to aid in battery orientation. To ensure proper insertion of the battery cartridge into the battery cavity, the battery cartridge cover 11 is contoured, for example, into a "D" shape. The battery cartridge 10 will not insert into the battery cavity 80 if not oriented properly.

Referring again to FIGS. 3A and 3B, a contact bar 58 is shown which provides electrical contact to the terminal end of battery 50. The contact bar 58 is assembled to the battery cartridge housing 46 by pressing the contact bar between the battery holding flange portions 56 of the battery cartridge housing. After the contact bar is pressed into contact with surface 44 between the battery holding flanges, gripping teeth 57 extending from the contact bar hold it firmly into place and prevent loosening. This assembly method eliminates the need for a secondary fastening or bonding step.

Figure 4:
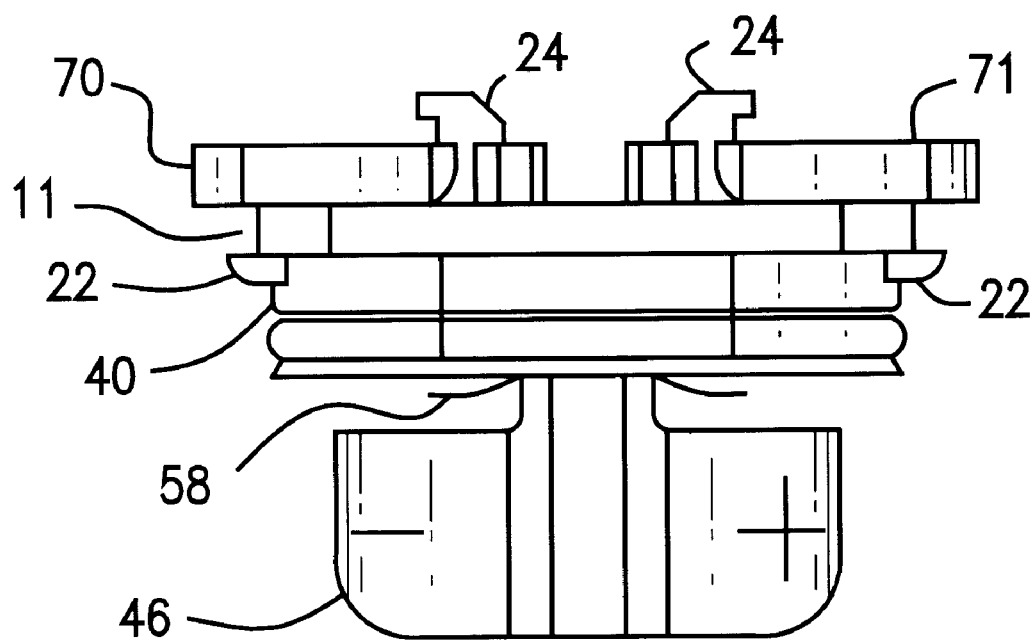
FIG. 4 is a diagram of the battery cartridge with latch extension for low-profile pressing.

As shown in FIG. 4, elements 70, 71 act as levers for the user to press inward when removing the battery cartridge 10. Specifically, they provide a low profile pressing force which is very beneficial if the battery cartridge is being used in a sandy or dusty environment. If minute foreign material particles, such as sand or dust, enter the interior of the battery cartridge and become trapped, the levers enable the latches to be pressed in so that the foreign material can be easily removed. Without the latch extensions, it would be difficult to press the latches inward if foreign material were trapped in the interior of the battery chamber.

The levers also provide a pulling surface for the user. If the battery cartridge is being removed from the battery cavity of a device and the batteries are not loaded into the battery cartridge, then the battery cartridge does not automatically eject when the levers, and thus latches, are pressed inward. The o-ring creates a vacuum within the battery cavity and the battery cartridge must be pulled out. Therefore, the latch extensions (i.e. levers) are useful as a pulling surface when removing an unloaded battery cartridge.

During the insertion of a battery cartridge into a battery cavity, the user often will push down on the outside surface of the battery with the thumb. In the first embodiment, described above, the user might press between the two levers 70, 71. During insertion, the latches must move inward in order to engage the locking slots 81 and 83 within the battery cavity 80. However, the user's thumb pressing down might prevent the latches from moving inward making insertion difficult.

Figure 5A:
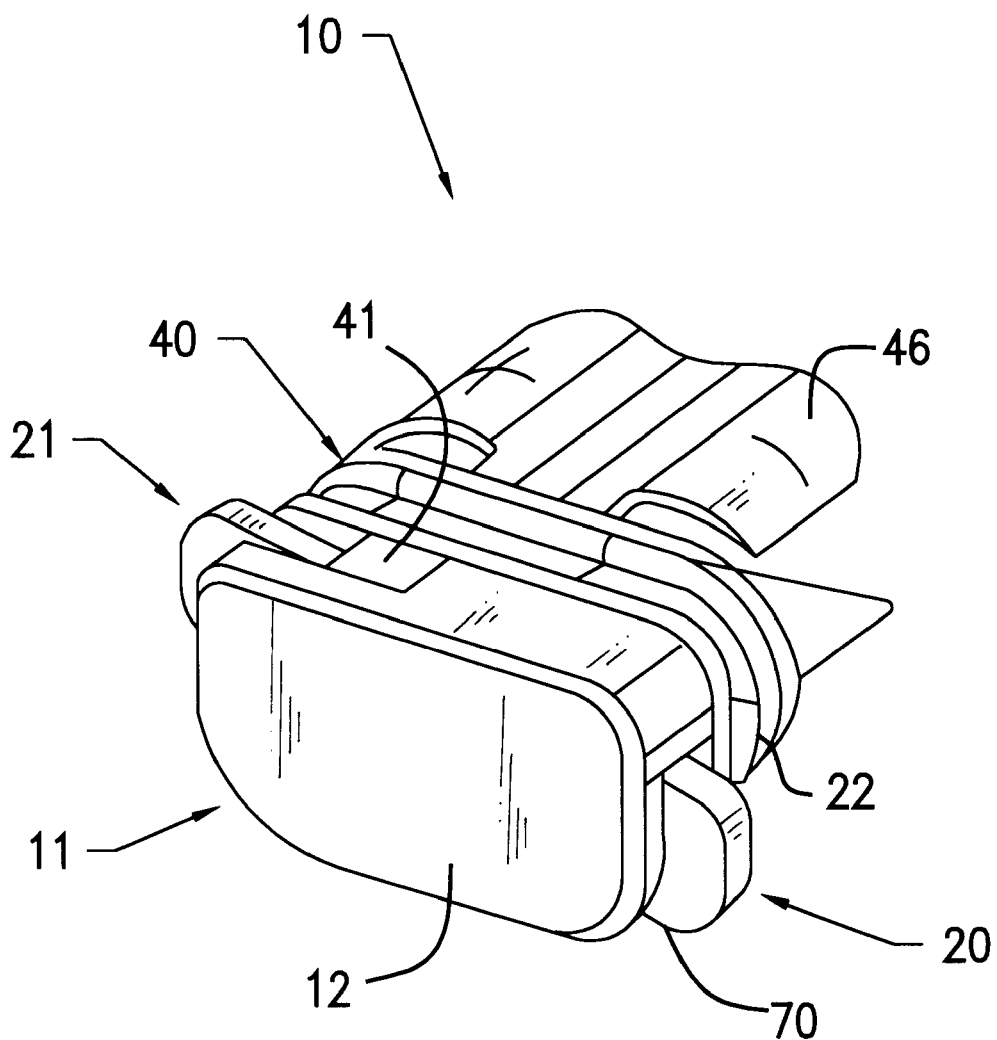
FIGS. 5A and 5B show assembled and exploded perspective views, respectively, of a battery cartridge according to an alternative embodiment of the present invention.
Figure 5B:
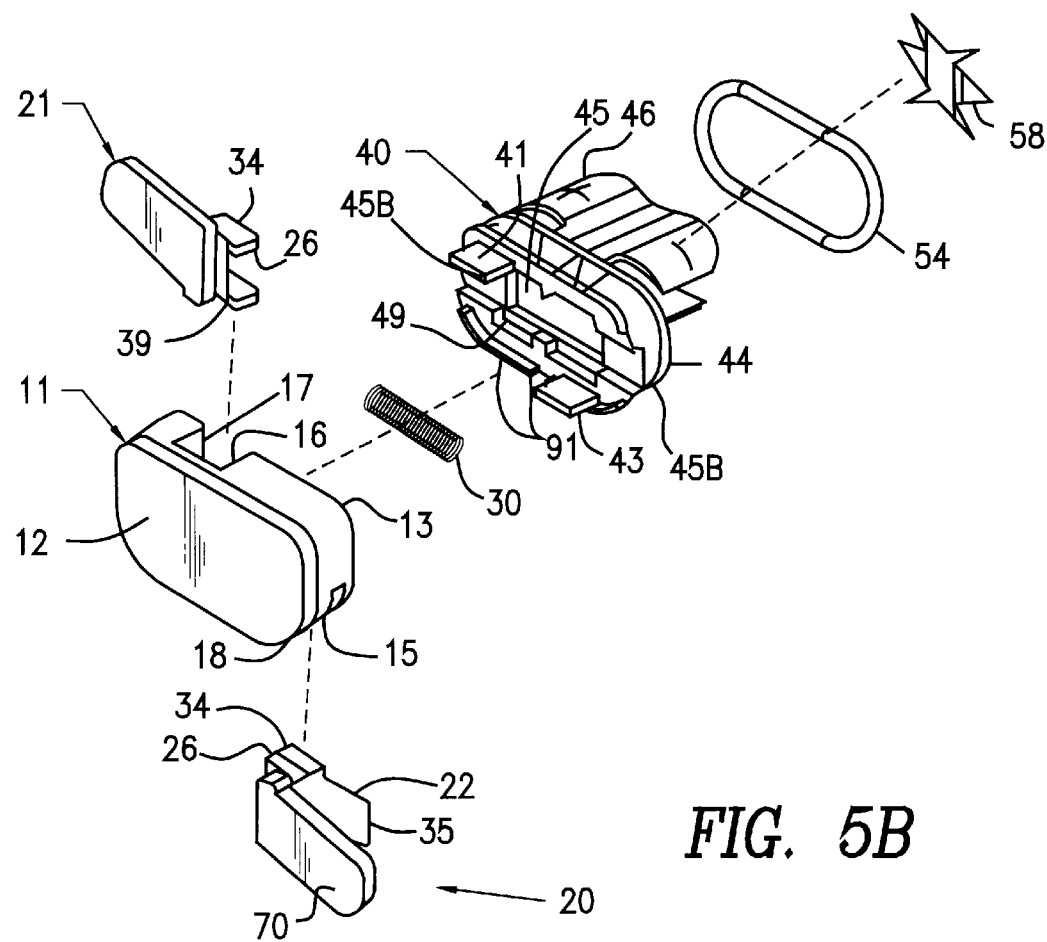
Figure 9A:
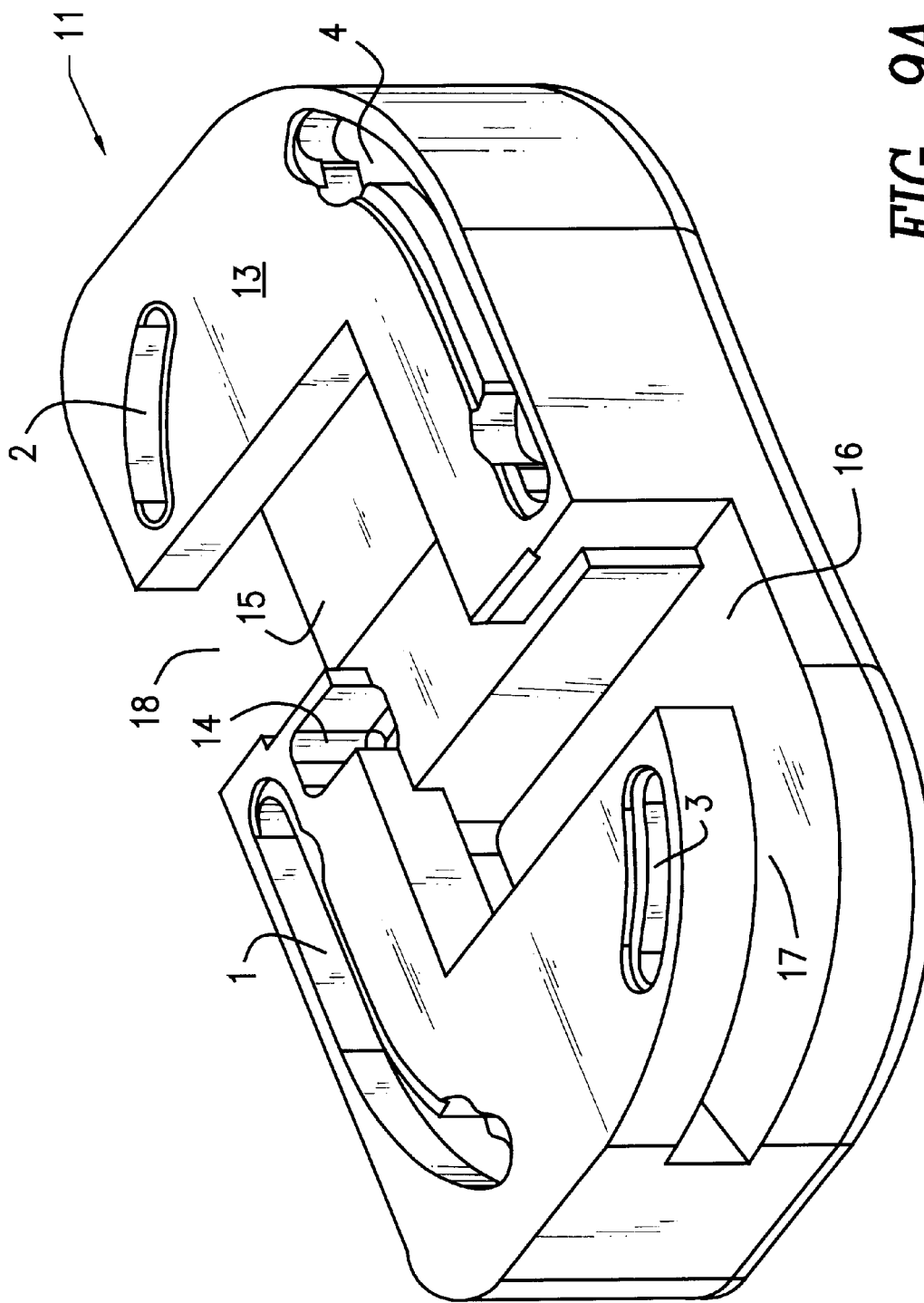
FIGS. 9A and 9B show perspective and front view of the inner surface of the front cover of the battery cartridge according to the present invention.
Figure 9B:
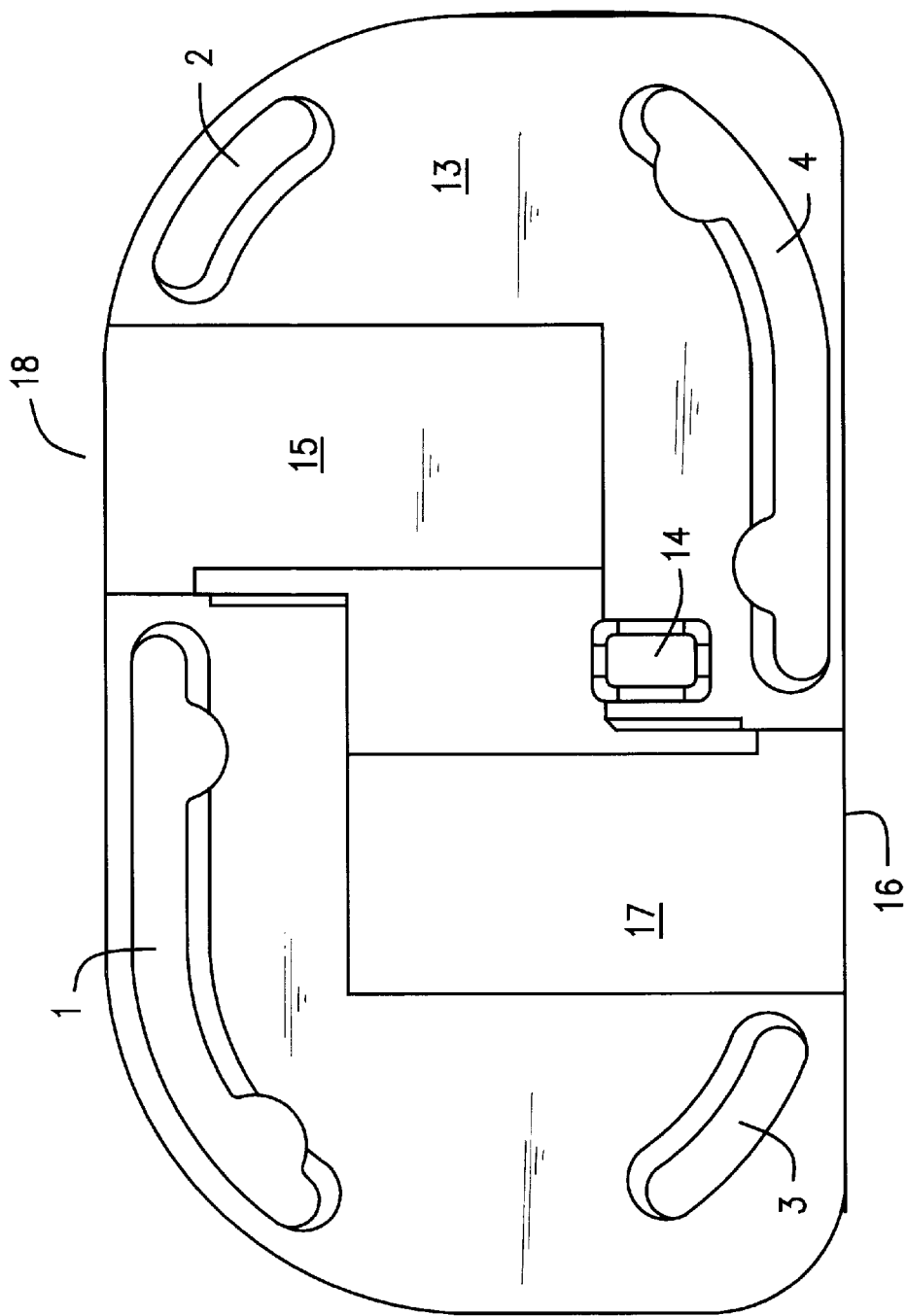

An alternative embodiment of the battery cartridge 10 is provided in FIGS. 5A–5B. The battery cartridge comprises a cover 11 with a smooth, solid outer surface 12 for the user to press down on during insertion. This surface 12 protects the latches 20, 21 from the user's thumb and enables the latches to move in or out freely, alleviating the insertion problem. The front cover 11 further comprises an inner surface 13 having first and second channels or cavities 15 and 17 for receiving each of the corresponding latches 20 and 21. FIGS. 9A–B provide a perspective and front view of the inner surface of front cover 11, including cavities 15 and 17 for receiving latches 20, 21, receptacle 14, and slots 1–4 for engaging corresponding projections from housing 40.

Figure 10A:
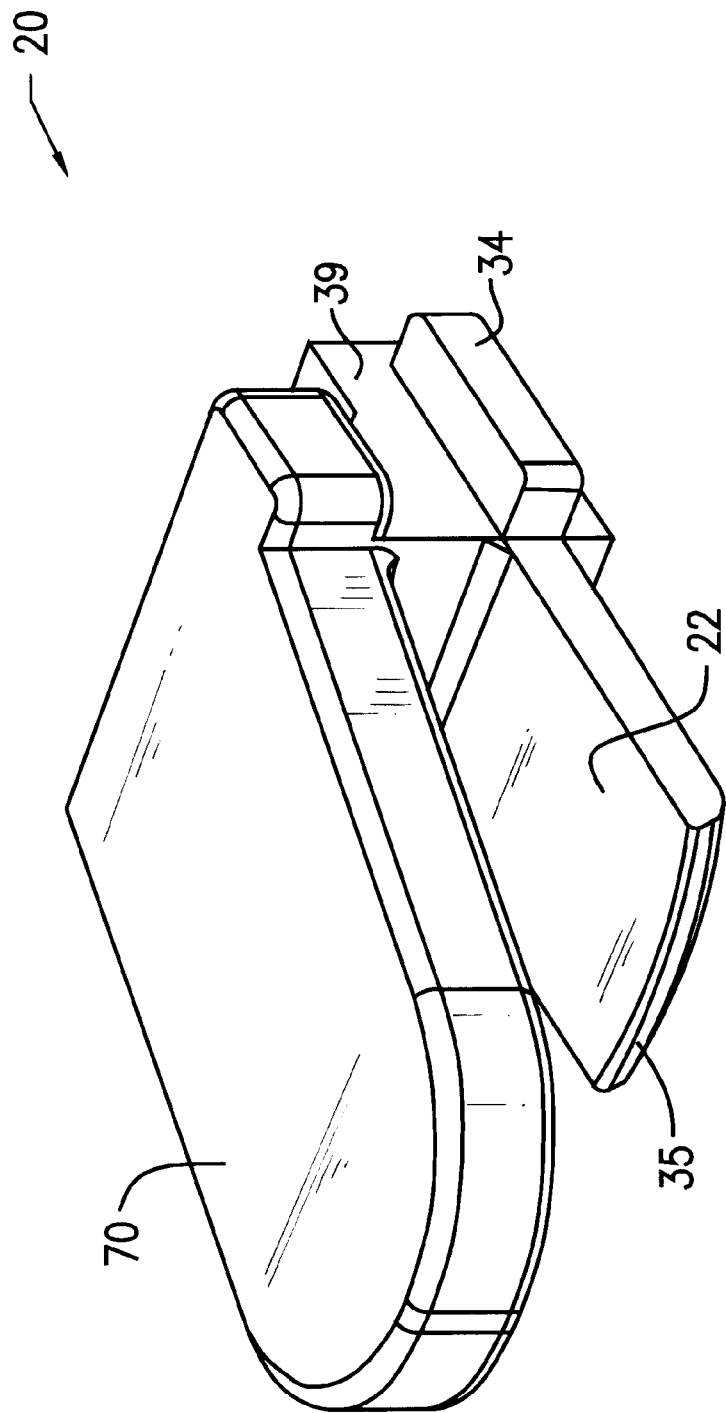
FIGS. 10A and 10B illustrate outer and inner perspective views of the latch portion of the battery cartridge according to the present invention.
Figure 10B:
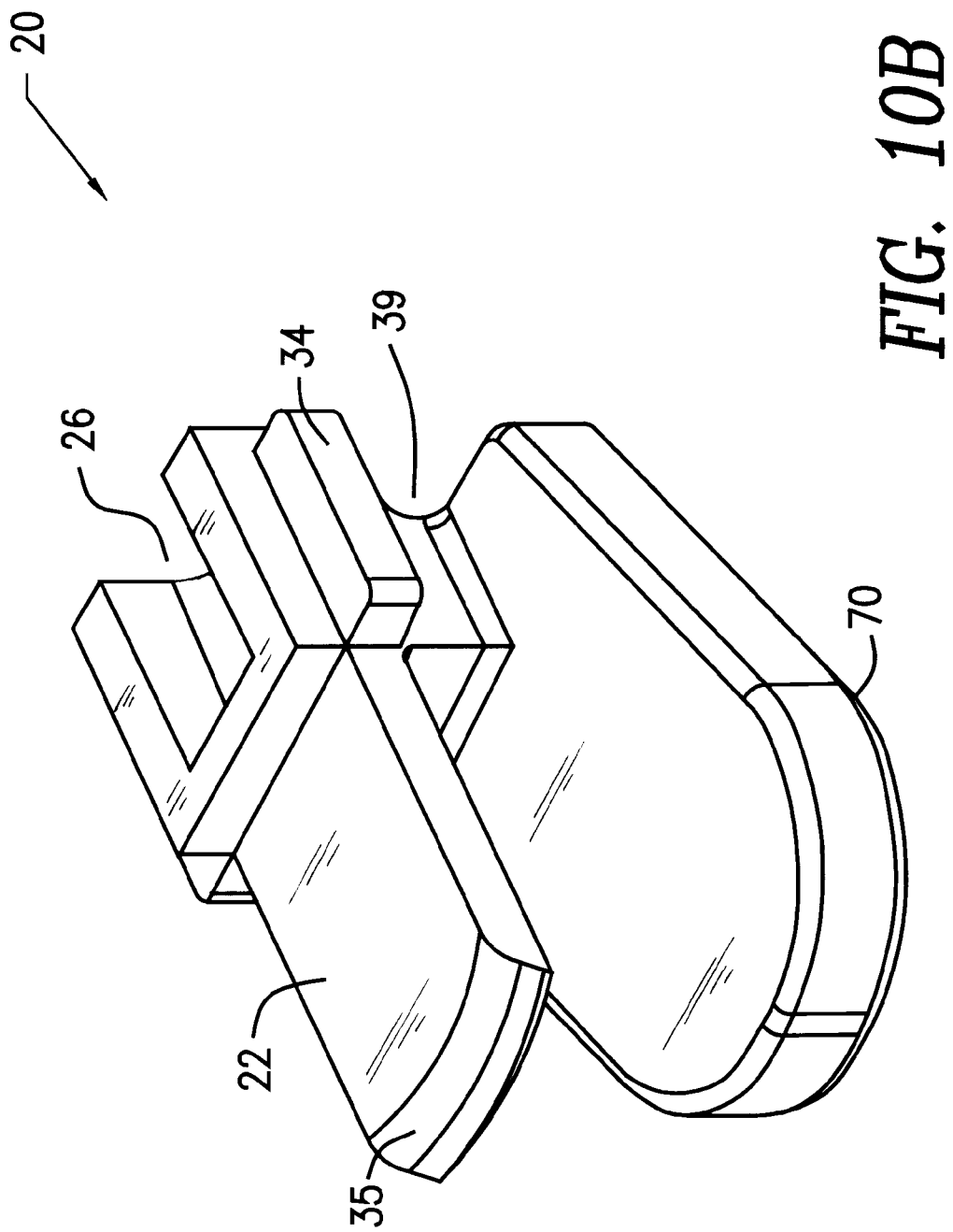

Referring again to FIGS. 5A–B, as in the first embodiment, each of the latches are oppositely disposed and in parallel alignment with one another, each having an extension portion 22 extending laterally and slidably engaging recess 45 in the housing. As shown in FIGS. 5A–B, the battery cartridge 10 according to this embodiment, comprises cover 11, latches 20, 21 which are inserted into cavities 15, 17 of cover 11. Spring 30 is positioned between the latches within cavity 26 and housing 40 for securing and coupling the latches 20, 21 and cover 11. As in the first embodiment, battery holders 46 extend outwardly from outer surface 44 of the housing, while o-ring 54 is adapted to fit over battery holder 46 and onto the periphery of surface 44 to sealingly engage the battery cartridge. As in the first embodiment, contact member 58 is coupled to surface 44 extending between the battery holders 46 to provide electrical contact for the battery (not shown). As one can ascertain, latches 20, 21 comprise both the latch extension portion 22 and the lever portion 70 monolithically coupled at a surface 39. Each latch 20, 21 further includes cavity portion 26 for receiving spring 30 and tip portion 35 stemming substantially parallel to lever portion 70. End or tip portion 35 is tapered or beveled at an angle of approximately 45° to permit slidable insertion into the battery cavity. Outer and inner perspective views of latch 20 are illustrated in FIGS. 10A–B.

In the alternative embodiment, the piece part count has been decreased since the lever has been combined with the latch. This eliminates a bonding process with each latch/lever assembly. Furthermore, two bonding processes per battery cartridge have also been eliminated. This not only reduces bonding processes and piece parts, but also reduces the likelihood of field breakage. Note further that the lever portions of each of the latches 20, 21 are disposed at opposing angles of inclination/declination of approximately 45 degrees with respect to the horizontal axis. Such orientation facilities gripping of the levers for depression.

Figure 11A:
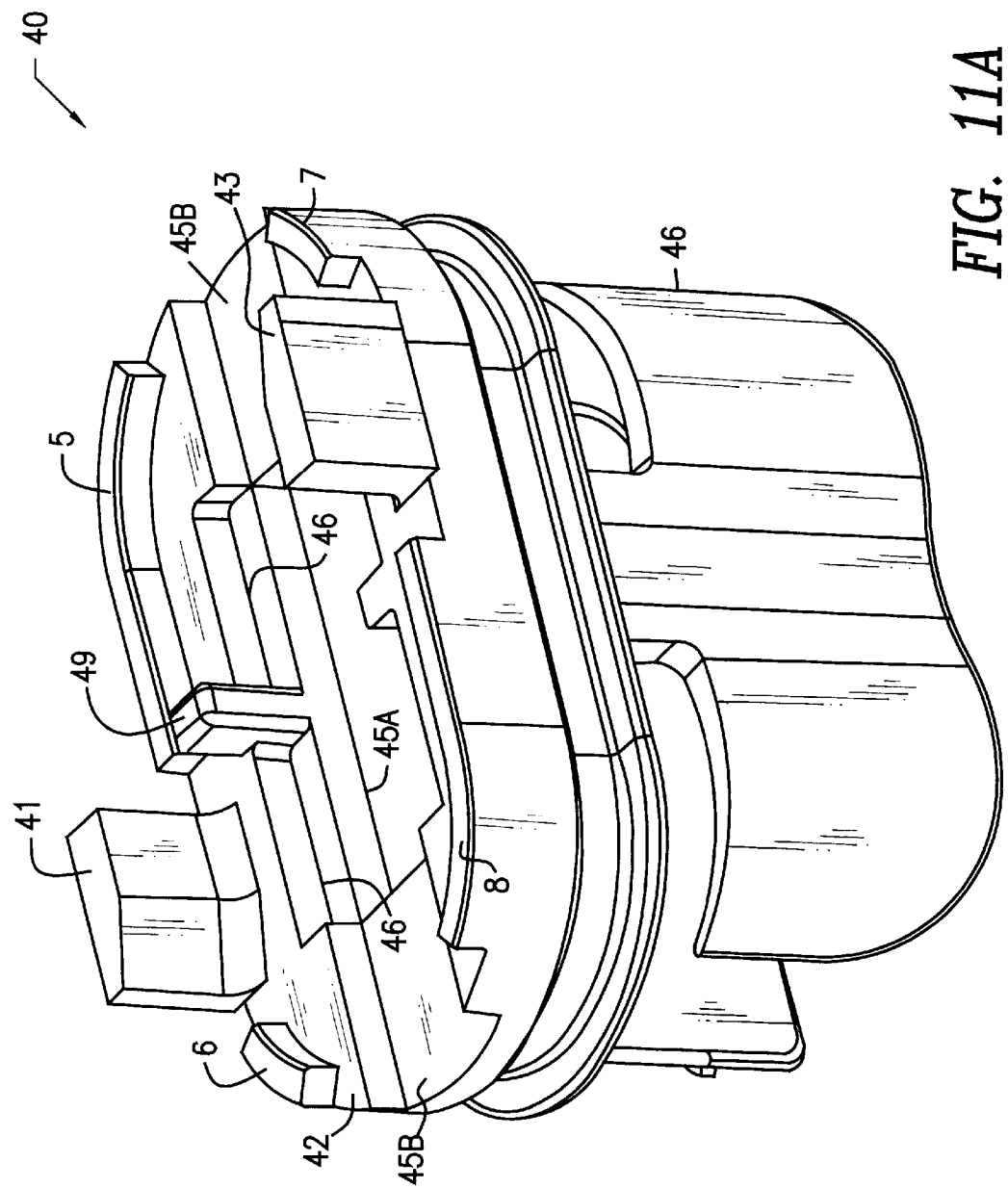
FIGS. 11A and 11B show perspective and side views, respectively, of the housing portion of the battery cartridge according to the present invention.
Figure 11B:
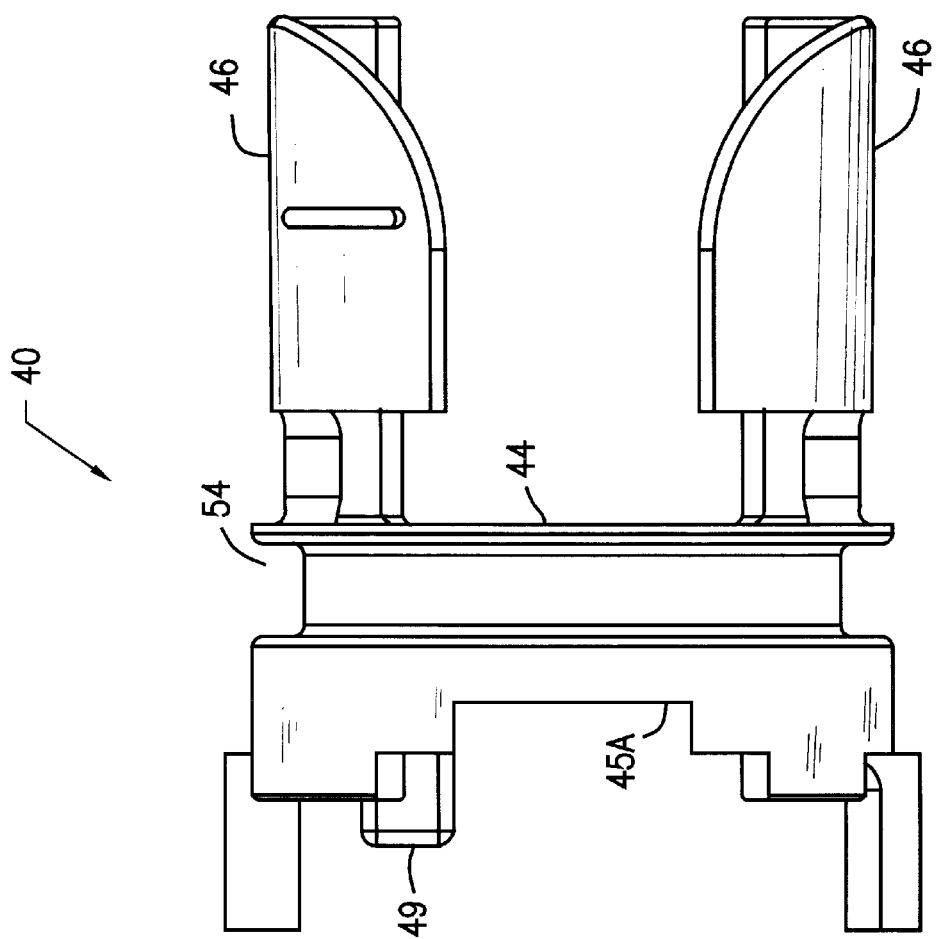

Referring to FIG. 5B, in conjunction with FIGS. 11A–B, housing 40 further includes roof members 41, 43 extending from inner surface 42 and disposed diagonally with respect to one another. Each roof member engages a corresponding top 16 and bottom 18 opening in the front cover in order to sealingly engage cavities 15 and 17. Housing 40 further includes orientation key member 49 extending from the interior 42 of the housing for alignment with corresponding receptacle 14 (FIG. 9) on the interior surface of cover 11 opposite surface 12. In this manner, the position of the orientation key member 49 and receptacle 14 are off-axis relative to the center of the battery cartridge, such that coupling of the cover 11 with housing 40 can occur in only one orientation.

As in the first embodiment, the front cover is shaped, for example, into a D shape to ensure proper insertion of the battery cartridge into the battery cavity. As a result, the battery cartridge will not insert into the cavity if not oriented properly. The battery cartridge of FIG. 5 is assembled as follows: The latches 20, 21 are slidably inserted into cover 11 at cavities 15, 17. The latches are slid in from the side and abut an interior surface (not shown) within cover 11. Spring 30 is then placed within cavity 26 between the latches. Adhesive is placed on the cover, and the housing 40 is pressed into place on the cover. As previously mentioned, two walls 41, 43 exist on the housing that close off the entrance in the cover where the latches were inserted. These walls help to prevent foreign material from entering the internal cavities of the battery cartridge. Contact 58 is then pressed onto surface 44 of the housing between the battery holders 46 and the o-ring 54 is installed.

It should be understood that a person skilled in the art may make many variations and modifications to embodiments utilizing functionally equivalent elements to those described herein. For example, while the embodiments shown encompass two AA batteries, a device incorporating only one battery of a particular type, or for that matter a plurality of batteries is envisioned. Furthermore, while the battery cartridge design is embodied in a monocular night vision device having a housing for the battery cavity, the battery cartridge may be used on any device which requires batteries to operate. Any and all such variations or modifications, as well as others which may become apparent to those skilled in the art are intended to be included within the scope of the invention as defined by the appended claims.

What is claimed is:

1. A battery cartridge holding an at least one battery for insertion into a battery cavity, comprising:

a housing including:

flexible holding means contoured to the shape of said at least one battery for receiving said battery and securing thereto, said flexible holding means disposed on a first outer surface of said housing, and a second inner surface having a recess formed therein;

latching means retractably extendable for engaging slots positioned on a peripheral lip portion of said battery cavity during insertion of said battery cartridge;

depressible lever means responsive to an external force for causing said latching means to retract for disengaging from said slots; and a front cover coupled to said inner surface of said housing for securing said latching means and said depressible lever means.

2. The battery cartridge according to claim 1, wherein said battery cartridge is inserted into said battery cavity by applying a force to said front cover causing said battery cartridge to slide within said cavity until said latching means engages said slots.

3. The battery cartridge according to claim 2, wherein said latching means comprises horizontally aligned left and right latch members, each said latch member comprising an extension portion and an arcuate receiver portion substantially perpendicular to said extension portion, said extension portion having a tip for engagement with said corresponding slot in said battery cavity, wherein said extension portion slidably engages said recess in said housing to enable retraction or extension, and wherein said tip extends beyond the periphery of said front cover absent depression of said lever means and retracts within said periphery of said front cover in response to depression of said lever means.

4. The battery cartridge according to claim 3, wherein each said tip of said latch extension portion comprises a beveled inner surface for facilitating insertion of said battery cartridge into said cavity.

5. The battery cartridge according to claim 3, wherein said depressible lever means comprises horizontally aligned left and right lever members, each said lever member having a cavity for engaging a corresponding one of said arcuate receiver members and securing thereto.

6. The battery cartridge according to claim 5, wherein each said extension member includes an inner surface on which is formed a cavity terminating at an inner wall for receiving a spring, said spring extending between cavities associated with said extension members and exerting an outward force operative to displace said extension members.

7. The battery cartridge according to claim 6, wherein each said latch member further comprises ledge portions located on a top and bottom surface respectively, thereof and extending vertically therefrom, wherein said top and bottom ledge portions slidingly engage corresponding ledge portions within said recess to permit horizontal movement of said latch members.

8. The battery cartridge according to claim 1, further comprising a contact member disposed on said first outer surface of said housing for providing electrical contact to said at least one battery.

9. The battery cartridge according to claim 8, wherein said contact member includes a plurality of toothed projections which engage said housing for securing said contact member to said first outer surface of said housing.

10. The battery cartridge according to claim 5, wherein said cover plate includes slots therein for receiving a corresponding said arcuate receiver portion, and wherein each said arcuate receiver portion extends through said slot cover and receivingly engages said corresponding lever member, such that said front cover is disposed between said lever member and said extension portion of said latch member.

11. The battery cartridge according to claim 5, wherein said cover plate includes a smooth outer surface and an inner surface having channels formed therein for receiving said depressible lever means such that only a portion thereof extends beyond the periphery of said cover.

12. The battery cartridge according to claim 10, wherein said cover and said battery cavity opening are D-shaped such that said battery cartridge is insertable into said battery cavity in only one direction.

13. A battery cartridge holding a plurality of batteries for insertion into a battery cavity, comprising:

a housing including first and second flexible holding members oppositely disposed with respect to one another on a first outer surface, and said first and second holding members defining a cavity contoured to a shape of said batteries for receiving said batteries and securing thereto;

a second inner surface having a recess formed therein;

latching means coupled between said inner surface of said housing and a front cover portion and retractably extendable for engaging/disengaging slots positioned on a peripheral lip portion of said battery cavity for permitting insertion/ejection of said battery cartridge into/from said battery cavity;

wherein said front cover portion comprises a substantially planar outer surface for depressing said battery cartridge into said battery cavity and an inner surface having first and second channels formed therein for receiving said latching means, and wherein said latching means comprises first and second latch members oppositely disposed and in parallel alignment with one another, each said latch member having a laterally extending body portion slidably engaging said recess in said housing and having a cavity therein for receiving a compressible spring, said spring extending between said cavities associated with said first and second latch members and exerting an outward lateral force operative to displace said latch members for enabling retraction and extension of said latch members, and a lever portion positioned in a corresponding said channel in said front cover and monolithically connected to said body portion.

14. The battery cartridge according to claim 13, wherein a tip of said body portion engages a corresponding said slot within said battery cavity during insertion of said battery cartridge, said tip extending beyond the periphery of said front cover absent depression of said lever portion and retracting within said periphery of said front cover in response to depression of said lever portion.

15. The battery cartridge according to claim 14, wherein said tip has a beveled inner surface for facilitating insertion of said battery cartridge into said battery cavity.

16. A battery cartridge holding a plurality of batteries for insertion into a battery cavity, comprising:

a housing including first and second flexible holding members oppositely disposed with respect to one another on a first outer surface, and said first and second holding members defining a cavity contoured to a shape of said batteries for receiving said batteries and securing thereto;

a second inner surface having a recess formed therein;

latching means coupled between said inner surface of said housing and a front cover portion and retractable extendable for engaging/disengaging slots positioned on a peripheral lip portion of said battery cavity for permitting insertion/ejection of said battery cartridge into/from said battery cavity;

wherein said front cover portion comprises a substantially planar outer surface for depressing said battery cartridge into said battery cavity and an inner surface having first and second channels formed therein for receiving said latching means, and wherein said front cover further comprises a cavity formed on said inner surface for receiving a guide member extending from said inner surface of said housing such that said housing and said front cover are matingly coupled in a predetermined configuration; and wherein said housing further includes a top and bottom roof portion extending from said inner surface of said housing and diagonally disposed with respect to one another for engaging a corresponding top and bottom opening in said front cover to act as a closure.

17. The battery cartridge according to claim 16, wherein a portion of said housing engages a corresponding inner wall of said battery cavity lip for preventing further insertion of said battery cartridge into said cavity.

18. The battery cartridge according to claim 17, wherein said inner surface of said housing is sealingly bonded to said inner surface of said front cover.

19. A battery cartridge for holding at least one battery for insertion into a battery cavity comprising:

battery holding means;

latching means retractably extendable from said cartridge for engaging slots in said battery cavity during insertion of said battery cartridge; and depressible lever means connected to said latching means and responsive to an external force for causing said latching means to retract for disengaging from said slots when removing said battery cartridge.

20. The battery cartridge according to claim 19 wherein the latching means comprises oppositely disposed latch members which are in parallel alignment with each other, each said latch member comprising an extension portion and an arcuate receiver portion substantially perpendicular to said extension portion, said extension portion having a tip for engagement with said corresponding slot in said battery cavity.

21. The battery cartridge according to claim 20, wherein each said extension portion includes an inner surface on which is formed a cavity terminating at an inner wall for receiving a spring, said spring extending between said cavities associated with said extension portions and exerting an outward force operative to displace said extension portions.

22. A battery cartridge for holding at least one battery for insertion into a battery cavity comprising:

battery holding means;

a plurality of latch elements which retractably extend from said cartridge and engage slots in said battery cavity during insertion of said battery cartridge; and a depressible lever connected to each latch element which, responsive to an external force, urges said latch element to retract from engagement with a slot for removing said battery cartridge from said cavity.

23. The battery cartridge according to claim 22, wherein there are two latch elements which are oppositely disposed and in parallel alignment with each other.

24. A battery cartridge for holding at least one battery for insertion into a battery cavity, comprising:

battery holding means; and first and second latch members oppositely disposed and in parallel alignment with one another, each said latch member being spring loaded so that an outward lateral force is exerted on said latch members, so as to urge said latch members into slots in said battery cavity when said cartridge is inserted therein.

25. The battery cartridge according to claim 24, wherein an inner surface of said cartridge has a recessed region and wherein said first and second latch members are mounted so as to be slidable in said recessed region.

26. The battery cartridge according to claim 25, wherein each said latch member has a channel for accommodating, a compressible spring which effects said spring loading.

27. The battery cartridge according to claim 26, further including a cover which comprises a substantially planar outer surface for depressing said battery cartridge into said battery cavity.

* * * * *